J. ZINK.

Thrashing Machine.

No. 10,558

Patented Feb. 21, 1854.

UNITED STATES PATENT OFFICE.

JOHN ZINK, OF GREENSVILLE, VIRGINIA.

THRESHER AND SEPARATOR OF GRAIN.

Specification of Letters Patent No. 10,558, dated February 21, 1854.

*To all whom it may concern:*

Be it known that I, JOHN ZINK, of Greensville, in the county of Augusta and State of Virginia, have invented certain new and useful Improvements in Machines for Threshing, Cleaning, and Separating Grain; and I do hereby declare the following to be a full, clear, and exact description of the same, reference being had to the accompanying drawings, in which—

Figure 1:
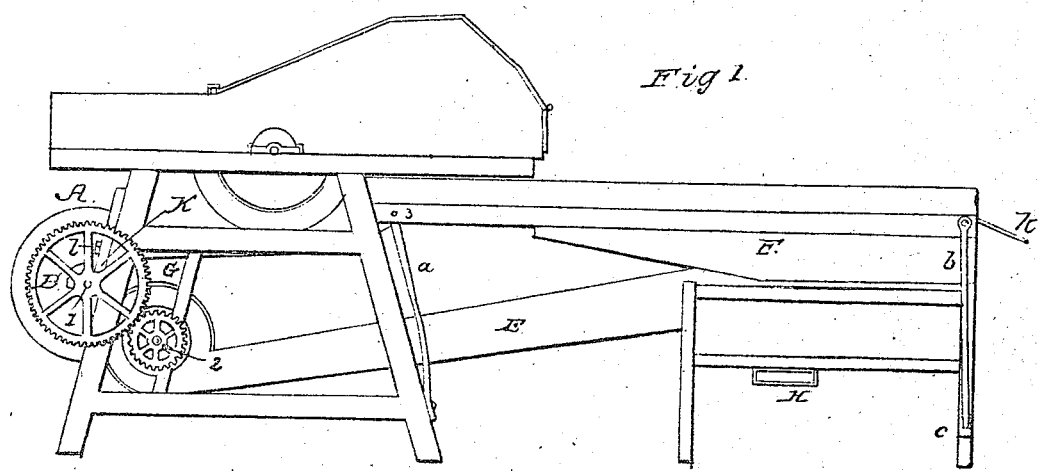
Figure 2:
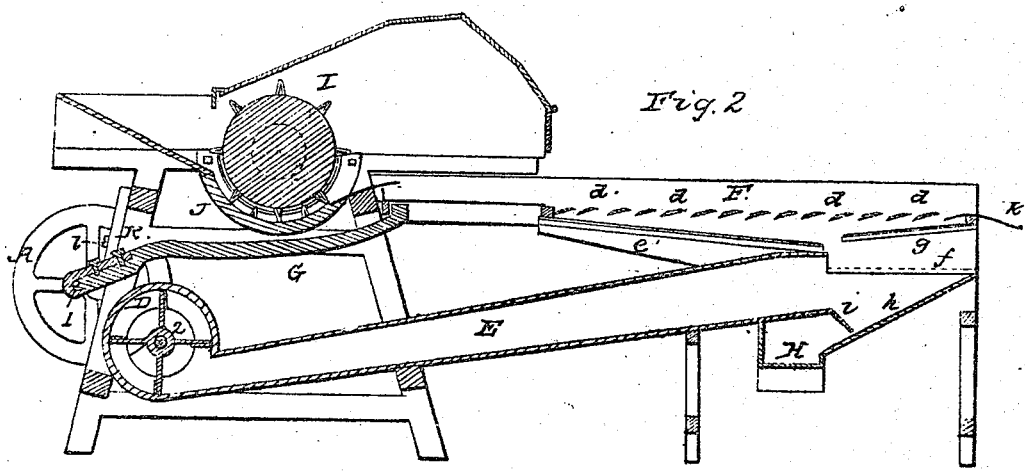

Figure 1, represents a view from one of the sides of the machine, and Fig. 2, a longitudinal vertical section through the same.

Similar letters in both the figures refer to like parts.

The nature of my invention consists in the arrangement of the straw carrier, and apron, on the same shaking frame with the screen, so that the same motion which shakes out the grain from the straw, and carries the latter forward and out of the machine, shall also carry forward on said apron, the grain to the screens and blast.

Power may be communicated to the machine by a belt passing over the pulley A, which is arranged on a crank shaft 1 carrying on its opposite end the cogwheel B, which meshes with a pinion C, on the shaft 2 of the fan blower D, arranged in a concave in the usual manner, where the blast is created, and from whence it passes through the blast conductor E and strikes the screens at the extreme point of the vibrating frame F. The crank shaft 1 has upon it a curved pitman G, which connects with, and gives motion to, the vibrating frame F, as follows: springs $a$, (one only being seen) are secured to the frame of the machine, which are connected together by a rod 3, and this rod is attached to the frame F. The pitman G, is also connected to this rod or roller 3. On the extreme outer end of the frame F, are hinged supports $b$, the lower ends of which rest in steps $c$, which allows the frame to vibrate—the springs taking off the sudden jar and relieving the pitman by their reaction.

$d$, $d$, &c., are the slats which form the straw carrier, and from their inclination and motion carry the straw forward, and shake out the grain from the straw, the grain dropping upon the inclined apron $e$, by which it is carried and dropped onto the screen $f$. Another apron $g$, inclining from the end of the straw carrier, receives and carries back what grains may drop through while and after passing the screen, and returns them to be operated upon by the blast. The cleaned grain drops through the screen $f$, onto the inclined board $h$, and passes into the receptacle H. The bottom of the blast conductor is also inclined downward (as seen at $i$, Fig. 2,) so that while the blast may strike the screen in its whole length, the grain dropping through said screen may not fall into the blast conductor.

$k$ is a projecting board to carry off the straw clear of the screen.

The threshing cylinder I and concave J may be constructed in any of the well known plans, and the cylinder may be driven by a band from the pulley A or by any other means. Both the cylinder and concave are furnished with teeth in the well known manner.

The machine is so put together as that the threshing and cleaning portions may be separated readily, and in order that the fan blower may be thrown out of gear I hang the shaft 1, carrying the cog wheel B, in sliding boxes K, held to the frame by the set screws $l$, so that the shaft can be raised until the cog wheel B, is ungeared from the pinion C, and the threshing apparatus alone may be used. To separate the two parts the rod 3 needs only to be removed and all the vibrating portion of the machine may be lifted off. The blast conductor is also in sections so that in moving the machine or stowing it away, it may be done compactly and readily.

Having thus fuly described the nature of my invention what I claim therein as new and desire to secure by Letters Patent is—

The arrangement of the straw carrier, and apron $e$ on the same shaking frame F with the screen $f$, so that the same motion which shakes out the grain from the straw, and carries the latter forward and out of the machine, shall also carry forward on said apron, the grain to the screens and blast, as described.

JOHN ZINK.

Witnesses:
A. B. STOUGHTON,
L. L. SMITH.